United States Patent
Sarsfield et al.

(10) Patent No.: US 6,916,449 B2
(45) Date of Patent: Jul. 12, 2005

(54) EXHAUST TREATMENT DEVICE AND PROCESS FOR FORMING THE SAME

(75) Inventors: Robert A. Sarsfield, Grand Blanc, MI (US); Gregory T. Roth, Davison, MI (US); James T. Harris, Metamora, MI (US)

(73) Assignee: Delphi Technologies, Inc., Troy, MI (US)

(*) Notice: Subject to any disclaimer, the term of this patent is extended or adjusted under 35 U.S.C. 154(b) by 674 days.

(21) Appl. No.: 10/008,301

(22) Filed: Nov. 6, 2001

(65) Prior Publication Data

US 2003/0086833 A1 May 8, 2003

(51) Int. Cl.⁷ .............................. B01D 53/34; F01N 3/28
(52) U.S. Cl. ....................... 422/179; 422/177; 422/180; 29/890
(58) Field of Search ................................ 422/177, 179, 422/180; 29/890

(56) References Cited

U.S. PATENT DOCUMENTS

| | | | |
|---|---|---|---|
| 6,159,430 A | 12/2000 | Foster et al. ................. 422/179 |
| 6,338,827 B1 | 1/2002 | Nelson et al. ......... 422/186.07 |
| 6,354,903 B1 | 3/2002 | Nelson ......................... 29/890 |
| 6,361,821 B1 | 3/2002 | Anderson et al. .............. 427/58 |
| 6,391,822 B1 | 5/2002 | Dou et al. .................... 502/325 |
| 6,438,839 B1 | 8/2002 | Hardesty et al. .............. 29/890 |
| 6,455,463 B1 | 9/2002 | Labarge et al. ............. 502/340 |
| 6,464,945 B1 | 10/2002 | Hemingway ................ 422/174 |
| 6,464,947 B2 | 10/2002 | Balland ....................... 422/180 |
| 6,497,847 B2 | 12/2002 | Foster et al. ................ 422/177 |
| 6,532,659 B1 | 3/2003 | DeSousa et al. ............. 29/890 |
| 6,591,497 B2 | 7/2003 | Foster et al. .................. 29/890 |
| 6,605,259 B1 | 8/2003 | Henry ........................ 422/179 |
| 6,613,296 B1 * | 9/2003 | Myers et al. ................ 422/179 |
| 6,623,704 B1 | 9/2003 | Roth .......................... 422/179 |
| 6,624,113 B2 | 9/2003 | Labarge et al. ............. 502/344 |
| 6,643,928 B2 | 11/2003 | Hardesty et al. .............. 29/890 |
| 6,773,681 B1 * | 8/2004 | Hrinevich, Jr. ............. 422/177 |

FOREIGN PATENT DOCUMENTS

WO WO 98/50688 * 11/1998

* cited by examiner

*Primary Examiner*—Hien Tran
(74) *Attorney, Agent, or Firm*—Paul L. Marshall

(57) ABSTRACT

An exhaust treatment device comprises: a substrate; an end-cone with a first end disposed about an end of the substrate and a second end comprising a snorkel; a mat support disposed over at least a portion of the end-cone, wherein the mat support comprises a slit in operable communication with a snorkel slot and a keyhole disposed at the opposite end of the slit as the snorkel slot, and wherein at least a portion of the snorkel protrudes through the snorkel slot; and a shell disposed around the mat support.

10 Claims, 2 Drawing Sheets

EXHAUST TREATMENT DEVICE AND PROCESS FOR FORMING THE SAME

BACKGROUND OF THE INVENTION

The disclosure relates to an exhaust treatment device, and in particular, an exhaust treatment device with a mat support having a relief slot.

Various types of exhaust treatment devices, e.g., catalytic converters, catalytic absorbers, diesel particulate traps, non-thermal plasma conversion devices, and the like, are employed in the treatment of exhaust gas streams in vehicles. These devices are employed to treat environmentally unfriendly exhaust gas elements, e.g., hydrocarbons (HC), carbon monoxide (CO), nitrogen oxides ($NO_x$), carbon, and/or soot. A typical catalytic converter, for example, comprises a catalyst disposed on a catalytic substrate. An end-cone is disposed in fluid communication with the catalytic substrate to provide a conduit between the catalytic substrate and the rest of the exhaust system. This combination of catalyst, catalytic substrate and attached end-cone forms a catalytic substrate subassembly, (hereinafter subassembly). Sandwiched in-between a shell and the subassembly is a mat support.

The mat support serves a number of functions. The mat support insulates the shell from both the high exhaust gas temperatures, and the heat generated by the exothermic catalytic reaction occurring within the catalytic substrate subassembly. The heat retained by the mat support also aids in maintaining the high temperatures necessary for the catalytic reaction to efficiently proceed. In addition, the mat support enhances the structural integrity of the subassembly by conveying compressive forces to the subassembly. These compressive forces reduce axial movement of the catalytic substrate within the shell and thus, retain the substrate and end-cones properly in place. The mat support shape and composition, thus, have a substantial impact on the operation and integrity of the catalytic converter as a whole.

In order to provide adequate support and insulation, the mat support is uniformly disposed around, and in contact with the subassembly. However, the end-cones of a catalytic converter, which may be conical in shape, are not often symmetrical about any one axis due to space limitations and other factors. These non-uniform shapes do not lend themselves to being uniformly covered by the mat support in the form of a flat sheet. Insulation and support of catalytic converter end-cones thus, requires a compromise between the lower cost option of providing intimate contact of an irregular shape with a mat support formed from a flat sheet, verses the higher cost option of pre-forming a molded insulation cover, often from a more expensive material.

SUMMARY OF THE INVENTION

Disclosed herein is an exhaust treatment device and method for making the same. The exhaust treatment device comprises: a substrate; an end-cone with a first end disposed about an end of the substrate and a second end comprising a snorkel; a mat support disposed over at least a portion of the end-cone, wherein the mat support comprises a slit in operable communication with a snorkel slot and a keyhole disposed at the opposite end of the slit as the snorkel slot, and wherein at least a portion of the snorkel protrudes through the snorkel slot; and a shell disposed around the mat support.

The method for making the exhaust treatment device comprises: disposing a first end of an end-cone over an end of the substrate to form a subassembly; disposing the subassembly through a snorkel slot in a mat support such that a snorkel of the end-cone protrudes through the snorkel slot, wherein the mat support comprises a slit in operable communication with both the snorkel slot and a keyhole, and wherein the mat support is disposed around at least a portion of the end-cone and at least a portion of the substrate; and disposing a shell around the mat support.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE PREFERRED EMBODIMENT

Figure 1:
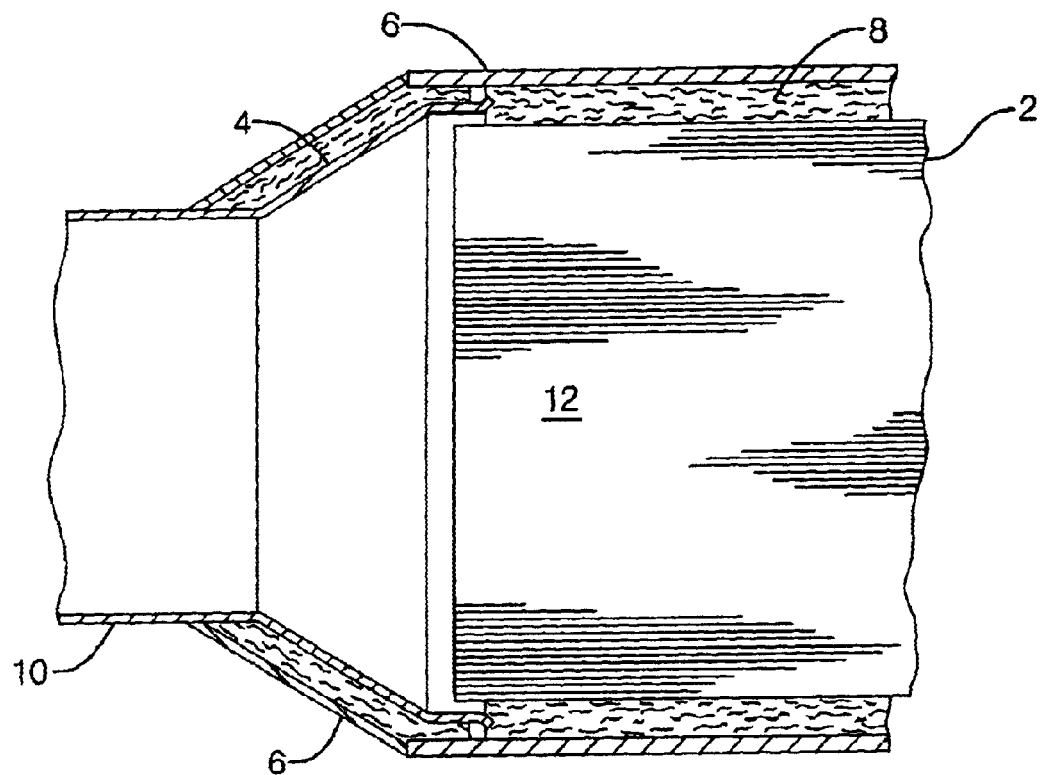
FIG. 1 is a partial cross-sectional view of an embodiment of an exhaust treatment device.

Referring to FIG. 1, an end-cone 4 is disposed on an end of a substrate 2, with an end-cone 4 terminating in a snorkel 10 at an end opposite substrate 2, to form a subassembly, generally referred to as 12. Subassembly 12 is at least partially, concentrically disposed within a mat support 8. Subassembly 12 and mat support 8, being partially disposed within a shell 6 such that snorkel 10 protrudes through the mat support 8 and shell 6 to provide fluid communication between substrate 2 and an exhaust system (not shown). In an alternative embodiment, a shell 46 is disposed around a mat support 48 that is disposed about an end-cone 44. (See FIG. 4)

The catalyst and substrate 2 comprise any combination of materials capable of functioning to reduce or eliminate unwanted components found in the exhaust gas stream that emanates from a spark ignition or diesel engine environment. Suitable substrate materials are capable of supporting the desired catalyst. Possible substrate materials include, for example ceramics, metallic foils, combinations comprising at least one of the foregoing substrates, and the like. Suitable ceramic materials include, for example, cordierite, silicon carbide, and combinations comprising at least one of the foregoing materials. Commercially available examples of suitable catalytic support materials include, for example, Cordierite (Corning, Inc., Corning, N.Y.) and Honey Ceram (NGK-Locke, Inc. Southfield, Mich.).

The catalyst, which is a catalyst for converting exhaust gasses to acceptable emissions levels, is disposed on and/or throughout the substrate. The catalyst may comprise one or more catalyst materials that are wash coated, imbibed, impregnated, physisorbed, chemisorbed, precipitated, or otherwise applied to the substrate. Possible catalyst materials include metals, such as platinum, palladium, rhodium, iridium, osmium, ruthenium, tantalum, zirconium, yttrium, cerium, nickel, copper, and the like, as well as oxides, alloys, and combinations comprising at least one of the foregoing catalyst materials, and other catalysts, such as carbon and the like.

Disposed around at least one end of the substrate is an end-cone 4 having a truncated conical geometry with an end suitably sized to engage the substrate 2 and a cylindrical end opposite the end engaging the substrate. In order to facilitate connection to an exhaust system component, the position of snorkel 10 may be offset from the centerline of the substrate 2. (See FIG. 3) Possible materials for the end-cone 4 include any material capable of maintaining the desired structural integrity in an operating environment consistent with exhaust gas treatment, e.g., temperatures up to about 1,000° C., exposure to exhaust gases, and extreme weather conditions. Although numerous materials and alloys can be employed, ferrous materials and alloys are typically used. High temperature, corrosion resistant, stainless steel is preferred, with stainless steel 400 series, e.g., type 409 and the like, being most preferred.

Similar to the end-cone 4, 44, the shell 6, 46, which is disposed around at least a portion of the end-cone 4, 44 and concentrically around the substrate 2, can comprise various ferrous materials. Preferably, the shell is disposed around the mat support 8, 48 and is sized and shaped depending on the size and shape of subassembly 12.

The mat support 8, 48, which can comprise a material that enhances the structural integrity of the substrate by applying compressive radial forces about it, reducing its axial movement, and retaining it in place, is concentrically disposed around the substrate. The mat support material can either be an intumescent material, e.g., one that contains ceramic materials (preferably in the form of fibers), and other materials such as organic binders and the like, or combinations comprising at least one of the foregoing materials, and a vermiculite component that expands with heating to maintain firm uniform compression, or non-uniform compression, if desired, or a non-intumescent materials, which does not contain vermiculite, as well as materials that include a combination of both. Non-intumescent materials include materials such as those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials include materials, sold under the trademark "INTERAM" by the "3M" Company, Minneapolis, Minn., as well as those intumescents which are also sold under the aforementioned "FIBERFRAX" trademark, as well as combinations thereof and others.

In order to insulate the shell 6, 46 from heat produced in the substrate 2 during operation, and to provide adequate structural integrity to the substrate 2, the mat support 8, 48 is preferably disposed about the periphery of the substrate 2, and at least a portion of the end-cone 4, 44, with little or no overlap preferred to prevent areas of increased density (i.e., a substantially constant mount density is preferred). The specific size and geometry of mat support 8, 48 depend upon the geometry and size of subassembly 12. Most preferably, mat support 8, 48 has a substantially uniform thickness comprising one or more layers and/or one or more portions. Optionally, varying thickness layer(s) can be employed to preferably obtain a substantially uniform mat support density.

Figure 2:
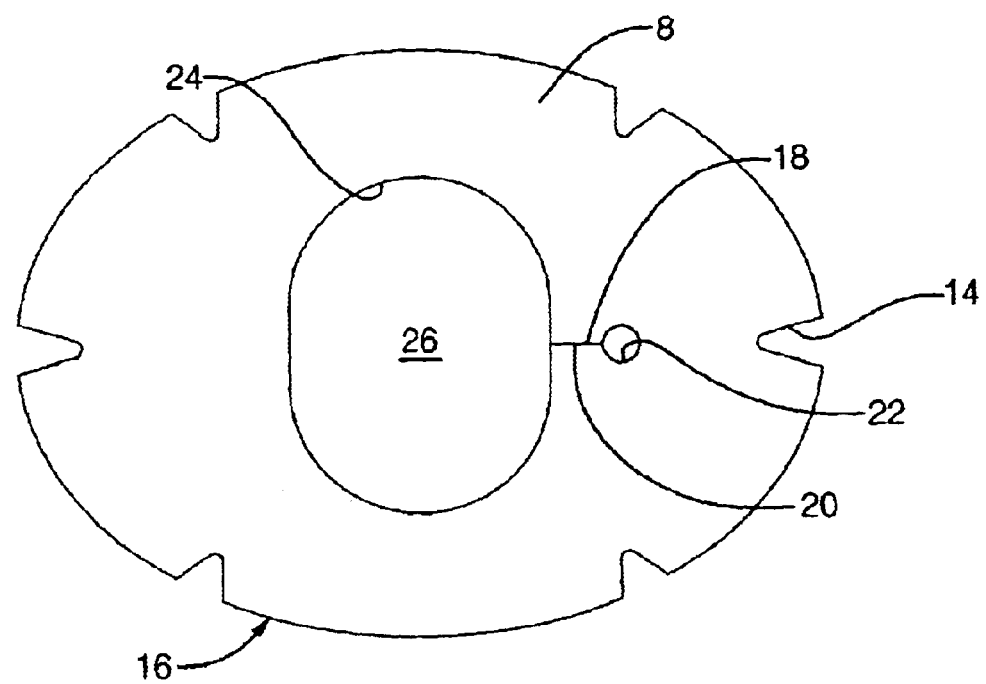
FIG. 2 is a planar view of an embodiment of a portion of a mat support.

When separate portions of mat support 8, 48 are used, different portions may be designed to abut and/or engage the other portions of mat support 8, 48. For example, portions of mat support 8, 48 disposed around end-cone 4, 44 abut portions of mat support 8, 48 disposed around substrate 2. Consequently, when end-cone 4, 44 is assembled onto substrate 2, an outer portion of mat support 8, 48 can either partially, or completely cover end-cone 4, 44 with little or no overlap. As shown in FIG. 2, a saw tooth pattern 14 present in a portion of mat support 8, 48 can be used to allow for a substantially uniform thickness of mat support 8, 48 about end-cone 4, 44. Although shown in FIG. 2 as a separate piece, mat support 8, 48 may be connected to the remainder of mat support 8, 48 in contact with the substrate 2.

To enable fluid communication between the substrate 2 and the remainder of the exhaust system, end-cone snorkel 10 can protrudes beyond mat support 8, 48. It need not, and often does not align coaxially with substrate 2. To allow for the placement of mat support 8, 48 in uniform contact with end cone 4, 44, while allowing the snorkel to protrude there through, a snorkel slot 24 is preferably provided in the mat support 8, 48. A saw tooth pattern 14, or the like, in the outer edge 16 of a portion of mat support material 8 may also be used to allow the mat support 8, 48 to cover the desired portion of the end-cone 4, 44 with a substantially uniform density. If the end-cone and substrate portions for the mat support 8, 48 are separate portions, this design enables the end-cone portion of the mat support to engage, abut, or otherwise contact the substrate portion of the mat support, maintaining substantially uniform density.

In order to further enable a uniform mat density over the end-cone, at least one keyway 18, is disposed in mat support 8, 48. The keyway 18 is preferably disposed tangential to and in contact with snorkel slot 24. The expansion in mat support 8, 48 provided by keyway 18 allows for compensation of non-symmetrical end-cones, as well as piece-to-piece irregularities that are a common part of mass production. Keyway 18 thus allows for a more consistently produced insulated and supported subassembly 12 compared to a mat support not comprising the keyway.

Keyway 18 comprises a slit 20 in mat support 8, 48 that terminates in keyhole 22. Keyway(s) are added to the end-cone insulation when the stress induced on the part exceeds its material strength. This stress is created during the transition of the insulation from its horizontal free state to the vertical end-cone wall, e.g., although the end-cone portion of mat support 48 is a single piece, it conforms to different geometries (different angles for sides 50 and 52). This combination of slit 20 and keyhole 22 allows for a flat sheet mat support to expand over end-cone 4, 44 without tearing during assembly. The geometry and size of both the slit 20 and keyhole 22 is dependent upon the size of the end-cone 4, 44. Preferably, the keyway 18 size and geometry is chosen to enable use with numerous end-cone designs and sizes. Possible slit shapes range from straight to curved (e.g., straight, saw tooth, scalloped, or the like, as well as combinations comprising at least one of the foregoing shapes), line from snorkel slot 24 to keyhole 22. Similarly, the shape of the keyhole 22 can range from rounded to multisided, e.g., circle, oval, triangular, square, rectangular, hexagonal, semi-circular, and the like, as well as combinations comprising at least one of the foregoing shapes.

Figure 3:
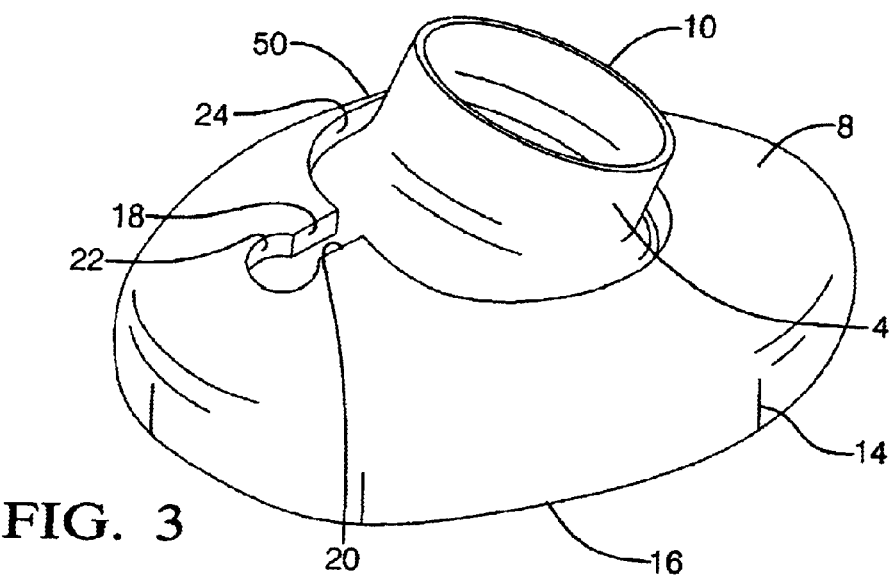
FIG. 3 is a perspective view of an embodiment of a mat support disposed about an end-cone having and end-cone snorkel protruding through a snorkel slot.
Figure 4:
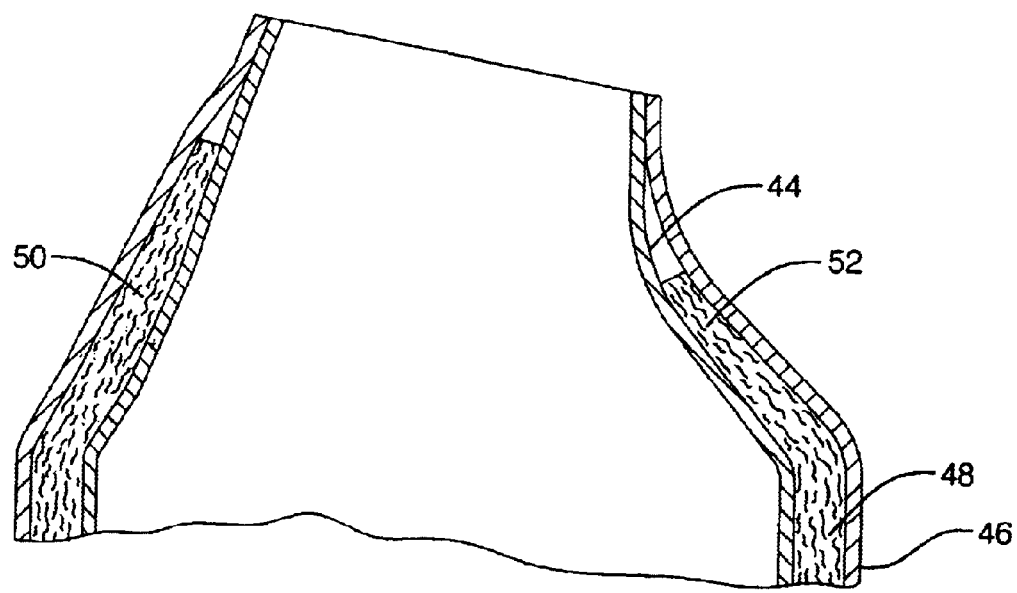
FIG. 4 is a partial cross-sectional view of another embodiment of an end-cone assembly for an exhaust treatment device.

The length, location and quantity of the keyways are all important in reducing the stress induced on the insulation during the assembly process. For example, for an exhaust treatment device comprising an end-cone as illustrated in FIGS. 3 and 4, a mat support without a keyhole would typically tear (i.e., the tear location) along side 50. However, with one keyhole 18 disposed at a location of about 75° to about 120°, preferably about 85° to about 9520 , and most preferably about 90°, from where a tear would typically occur, a tear is avoided. The preferred location and number of keyholes 18 can be determined via routine experimentation based upon where tears are typically observed and/or via modeling.

FIG. 3 depicts mat support 8, 48 in contact with end-cone 4, 44 having snorkel 10 protruding through snorkel slot 24. Shown is the expansion provided by slit 20 and keyhole 22 that form keyway 18. Saw tooth pattern 14 in an outer edge 16 of a portion of mat support 8, 48 is shown to enable the mat support to covering end-cone 4, 44 without overlap or areas of increased density.

Employment of keyway 18 enables the efficient production of a durable, low-cost exhaust system component from a low cost flat sheet of mat support material. This design reduces and generally eliminates stresses imposed by the shell 6, 46 that often result in a torn or ineffective mat support 8, 48 at the point where snorkel 10 protrudes therethrough. Although a portion of the keyway 18 may produce a small area of reduced mat density (e.g., a keyhole 22 and, depending upon the size of the snorkel 10, a slit 20), the area is very small, while the reduction in scrap and rework is substantially reduced.

Although the keyway design has been described in relation to a catalytic converter, it can be used on various exhaust system components that employ a mat support. Some possible components include evaporative emissions devices, hydrocarbon scrubbing devices, diesel particulate traps, non-thermal plasma reactors, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An exhaust treatment device, comprising:
   a substrate;
   an end-cone with a first end disposed about an end of the substrate and a second end comprising a snorkel;
   a mat support disposed over at least a portion of the end-cone, wherein the mat support comprises a slit in operable communication with a snorkel slot at one end and a keyhole at the opposite end thereof, and wherein at least a portion of the snorkel protrudes through the snorkel slot; and
   a shell disposed around the mat support.

2. The exhaust treatment device as in claim 1, wherein the slit has a shape selected from the group consisting of straight, saw tooth, scalloped, and combinations comprising at least one of the foregoing shapes.

3. The exhaust treatment device as in claim 1, wherein the keyhole comprises a shape selected from the group consisting of rounded, multisided, and combinations comprising at least one of the foregoing geometries.

4. The exhaust treatment device as in claim 1, wherein the mat support further comprises an outside edge having a saw-tooth geometry.

5. The exhaust treatment device as in claim 1, wherein the mat support comprises a potential tear location, and wherein the slit is disposed about 75° to about 120° from the tear location.

6. The exhaust treatment device as in claim 5, wherein the slit is disposed about 85° to about 95° from the tear location.

7. A process for forming an exhaust treatment device, comprising:
   disposing a first end of an end-cone over an end of a substrate to form a subassembly;
   disposing the subassembly through a snorkel slot in a mat support such that a snorkel of the end-cone protrudes through the snorkel slot, wherein the mat support comprises a slit in operable communication with the snorkel slot at one end and a keyhole at the opposite end thereof, and wherein the mat support is disposed around at least a portion of the end-cone and at least a portion of the substrate; and
   disposing a shell around the mat support.

8. A process for forming an exhaust treatment device as in claim 7, further comprising disposing a catalyst on the substrate.

9. A process for forming an exhaust treatment device as in claim 7, wherein the mat support comprises a potential tear location, and wherein the slit is disposed about 75° to about 120° from the tear location.

10. A process for forming an exhaust treatment device as in claim 9, wherein the slit is disposed about 85° to about 95° from the tear location.

* * * * *